US008629925B2

(12) United States Patent
Satou et al.

(10) Patent No.: US 8,629,925 B2
(45) Date of Patent: Jan. 14, 2014

(54) IMAGE PROCESSING APPARATUS, IMAGE PROCESSING METHOD, AND COMPUTER PROGRAM

(75) Inventors: Daisuke Satou, Kanagawa (JP); Atsushi Ueda, Tokyo (JP); Jun Minakuti, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/431,418

(22) Filed: Mar. 27, 2012

(65) Prior Publication Data
US 2012/0257076 A1 Oct. 11, 2012

(30) Foreign Application Priority Data
Apr. 5, 2011 (JP) .................................. 2011-083996

(51) Int. Cl.
  *H04N 9/64* (2006.01)
  *H04N 5/262* (2006.01)
  *H04N 5/228* (2006.01)
  *G06K 9/40* (2006.01)
(52) U.S. Cl.
  USPC ..................... 348/251; 348/240.3; 348/222.1; 382/255; 382/275
(58) Field of Classification Search
  USPC ............. 348/251, 240.3, 222.1; 382/255, 275
  See application file for complete search history.

(56) References Cited

U.S. PATENT DOCUMENTS

| 7,463,294 | B2 * | 12/2008 | Tsuda | 348/251 |
| 8,369,651 | B2 * | 2/2013 | Ishiga | 382/275 |
| 2002/0030755 | A1 * | 3/2002 | Uchino | 348/342 |
| 2002/0094131 | A1 * | 7/2002 | Shirakawa | 382/274 |
| 2004/0041919 | A1 * | 3/2004 | Yamanaka | 348/222.1 |
| 2005/0163398 | A1 * | 7/2005 | Ioka | 382/284 |
| 2007/0109427 | A1 * | 5/2007 | Satoh et al. | 348/231.2 |
| 2011/0001854 | A1 * | 1/2011 | Nguyen | 348/251 |
| 2013/0070117 | A1 * | 3/2013 | Imagawa | 348/222.1 |

FOREIGN PATENT DOCUMENTS

JP 2009-296031 12/2009
JP 2009296031 A * 12/2009

* cited by examiner

*Primary Examiner* — Nhan T Tran
*Assistant Examiner* — Xi Wang
(74) *Attorney, Agent, or Firm* — Oblon, Spivak, McClelland, Maier & Neustadt, L.L.P.

(57) ABSTRACT

An image processing apparatus includes: an image obtaining unit which obtains an image signal; an extraction position information obtaining unit which obtains information about an extraction position, where an image is extracted, from the image signal; a correction target value calculating unit which calculates a correction target value for correcting the image signal in accordance with the position information from an image center based on the extraction position information; an image correcting unit which corrects the image signal based on the correction target value; and an image extracting unit which extracts the image based on the extraction position information.

13 Claims, 10 Drawing Sheets

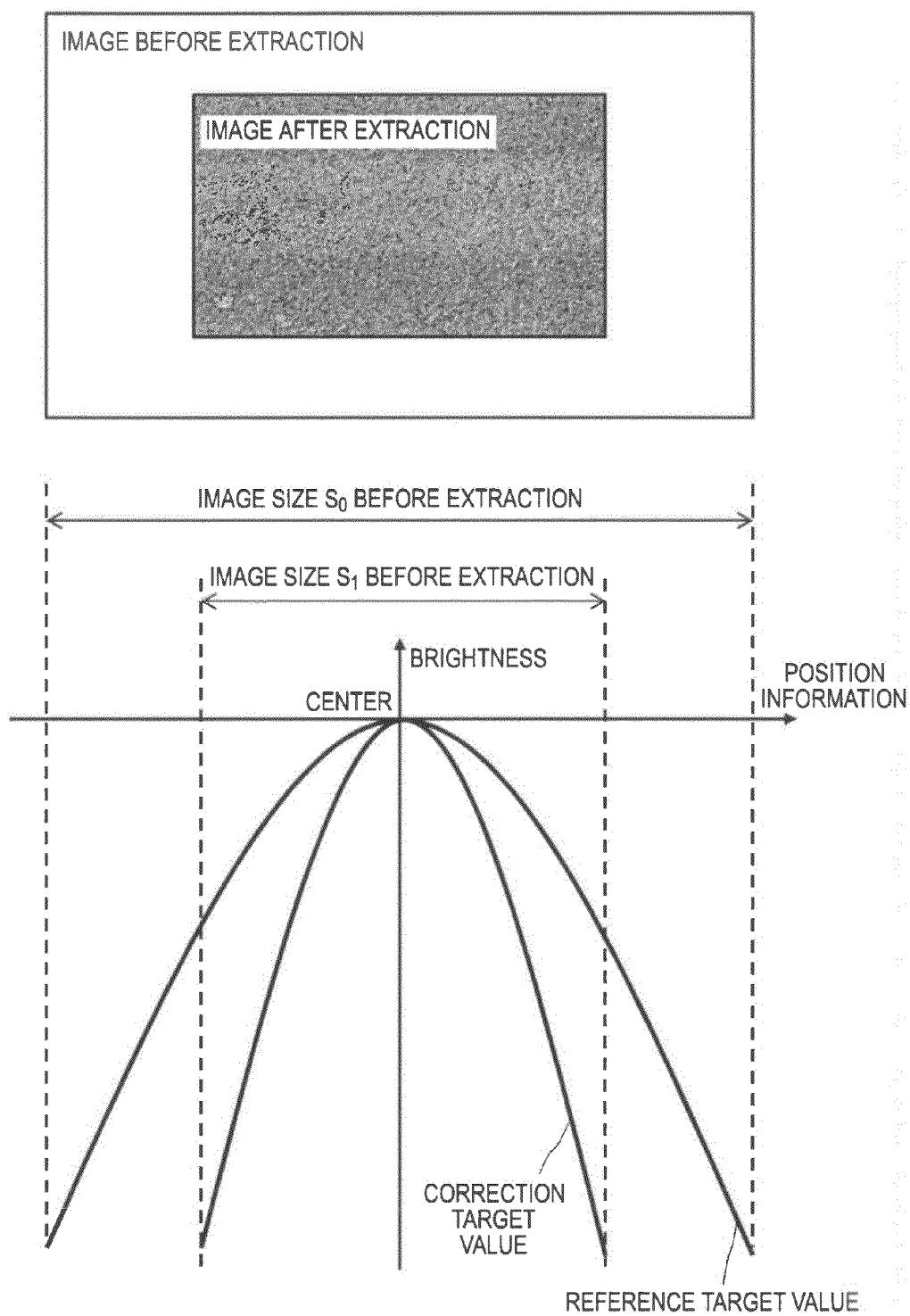

FIG.5A
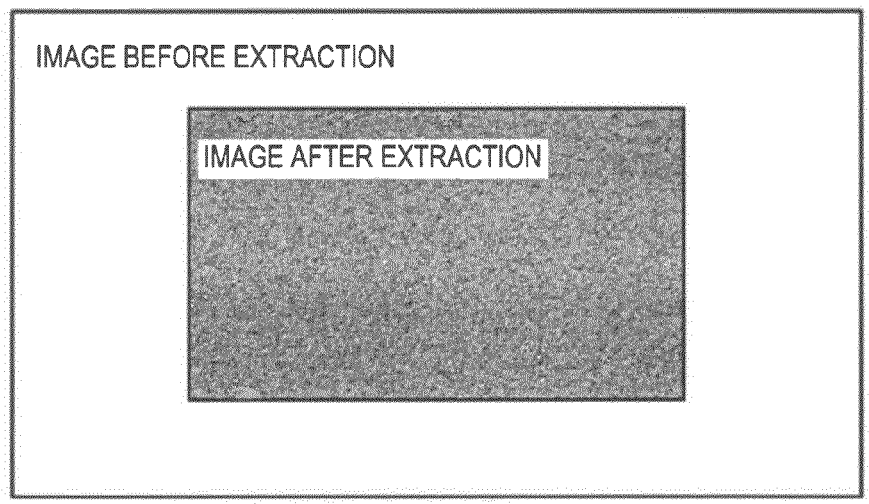
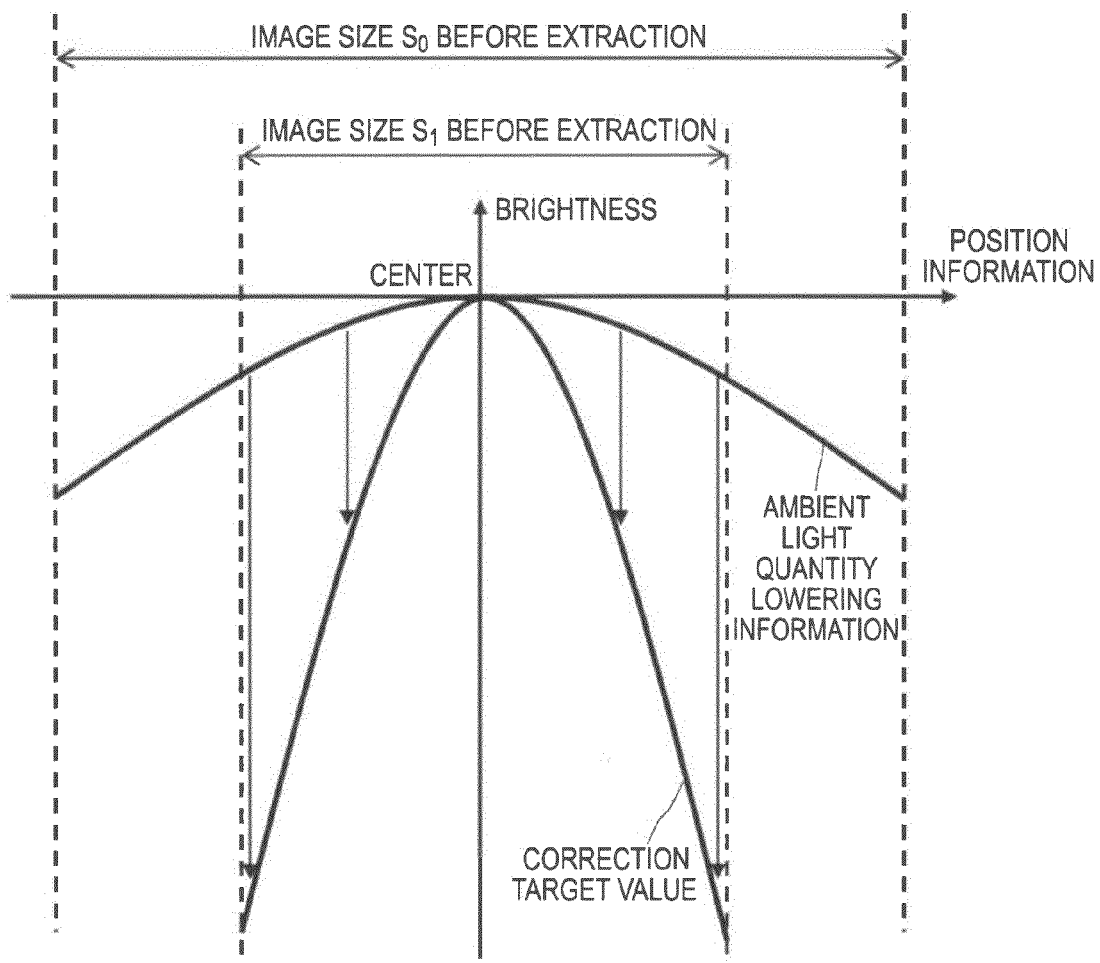

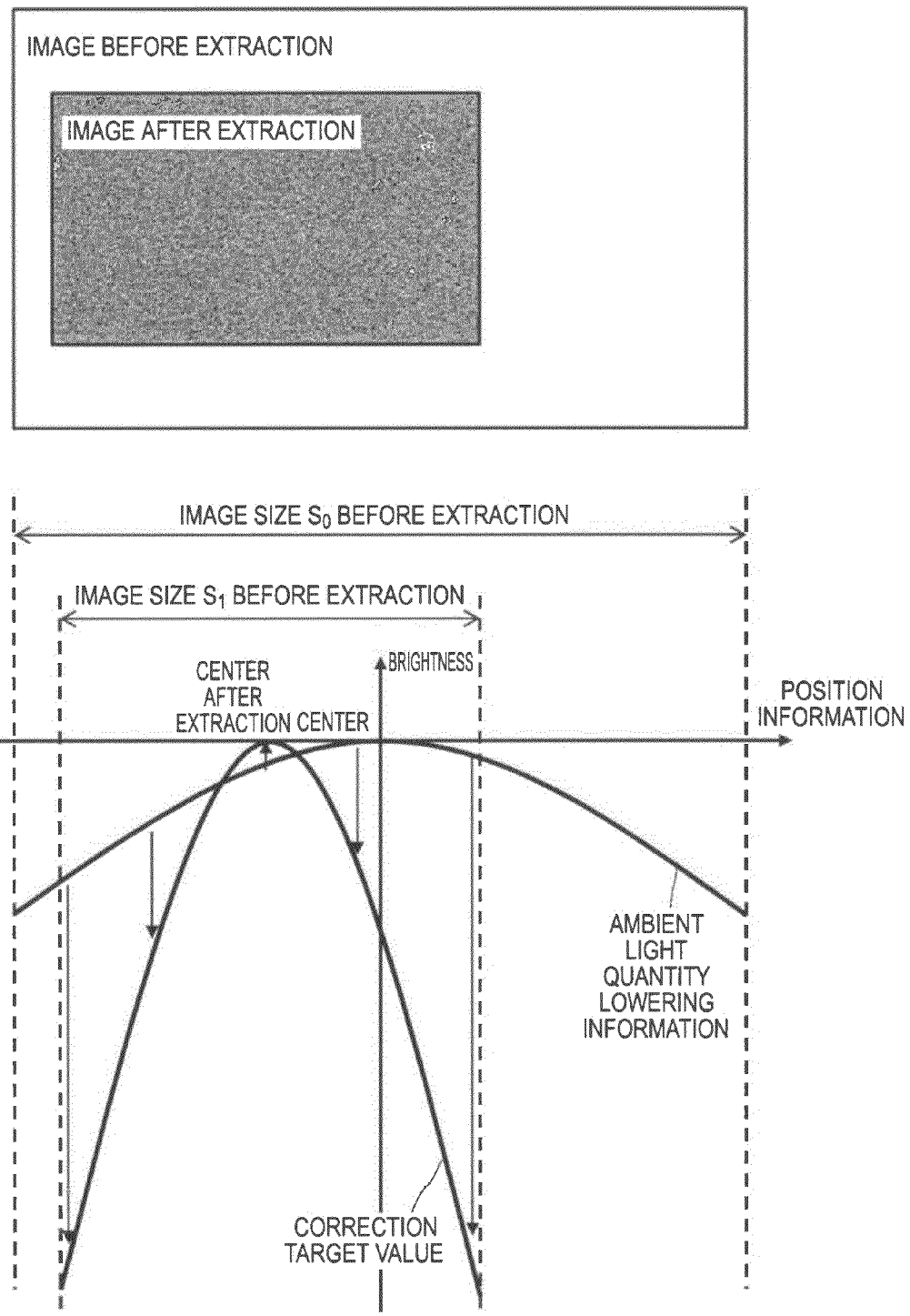

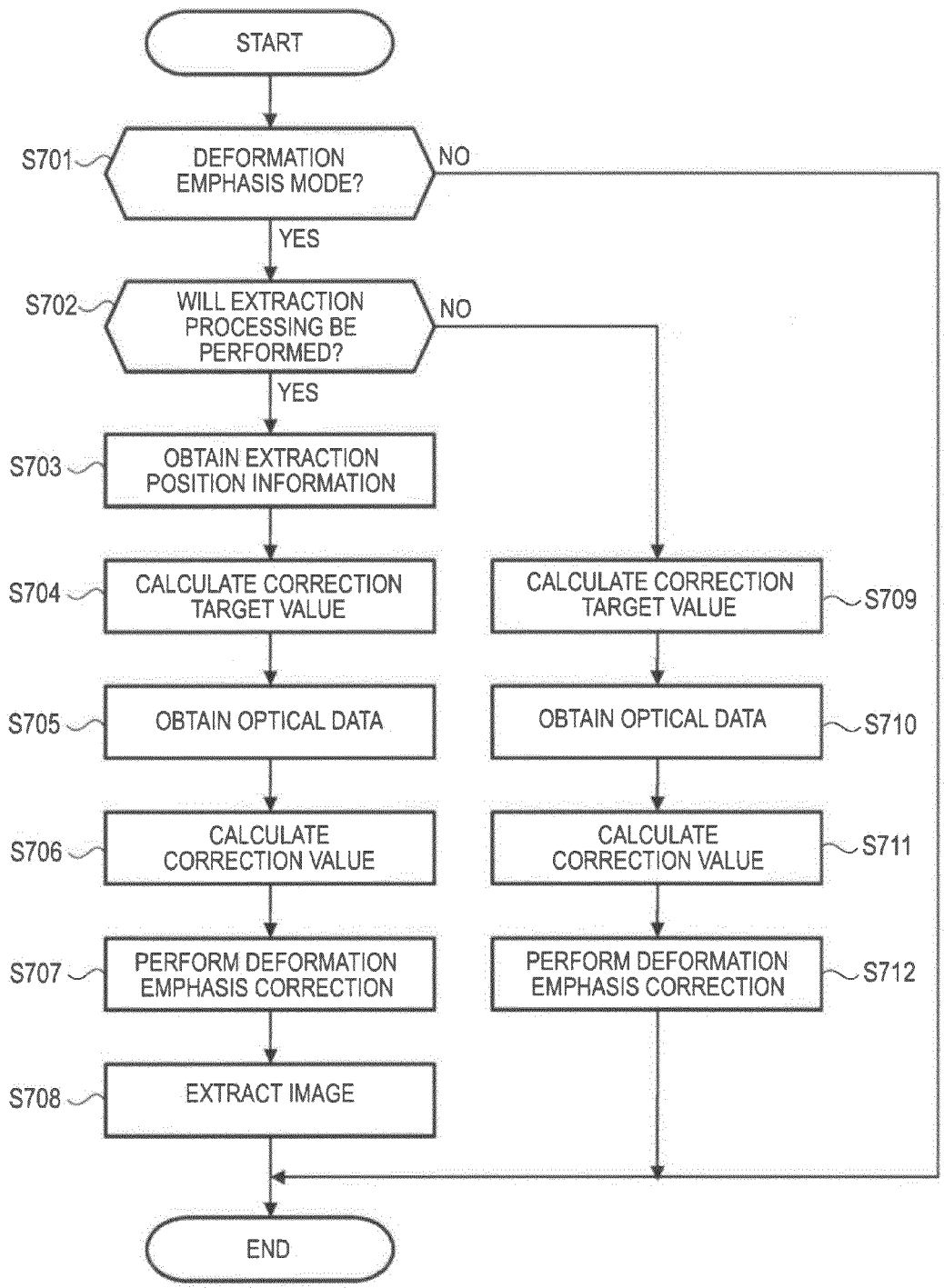

IMAGE PROCESSING APPARATUS, IMAGE PROCESSING METHOD, AND COMPUTER PROGRAM

FIELD

The present disclosure relates to an image processing apparatus, an image processing method, and a computer program which correct an image captured by a digital camera, for example, or another image and give an optical effect to the image.

BACKGROUND

A digital camera which performs digital coding on an image captured by an image sensor configured by a solid imaging device such as a CCD (Charge Coupled Device), a CMOS (Complementary Metal Oxide Semiconductor), or the like has been widely distributed instead of a silver salt camera which captured an image with the use of a film and a photographic plate. According to a digital camera, it is possible to further perform image processing and image management by a computer after storing a digital coded image on a memory. In addition, according to a digital camera, there is an advantage in that lifetime of the film does not become a problem.

For example, there is a product on which are mounted a trimming function of extracting a part of a captured image, a digital zooming function of extracting and recording a part of an image, and the like among digital cameras.

In recent years, an inexpensive toy camera with a simple configuration has attracted attention and been gradually supported by enthusiasts and artists. With such a trend, there is also a product provided with a mode for correcting an image captured by a digital camera to an image as imaged with a toy camera. According to a toy camera, deformation and blur frequently occur in a captured image as compared with a general product. Accordingly, in a toy camera mode in a digital camera, a captured image which originally has a high quality is corrected to an image with a lower ambient light quantity.

In such a toy camera mode, it is necessary to perform processing of lowering brightness in accordance with position information from an image center on a captured image signal. However, if a part of an image is extracted after correcting brightness in accordance with the position information from the image center in the same manner as in the image from which the extraction is not performed, the ambient light quantity is differently lowered as compared with an image from which the extraction is not performed. For this reason, there is a problem in that it is difficult to obtain a desired optical effect when trimming processing and digital zooming processing are performed. When the center position of an image after the extraction is different from the center position of the image before the extraction due to the trimming processing, in particular, an image in which the center position is deviated is obtained if a part of the image is extracted after performing the same correction as that for the image from which the extraction is not performed.

In addition, when deformation instead of brightness is corrected so as to be greater in accordance with the position information from the image center in the same way as a toy camera mode, the optical effect by the correction becomes different from that in the image before the extraction in the same manner if a part of the image is extracted after the correction. There is a technique disclosed in JP-A-2009-296031.

SUMMARY

It is desirable to provide an excellent image processing apparatus, an image processing method, and a computer program, which can perform correction to preferably give an optical effect, and which can further preferably give an optical effect by lowering brightness or enlarging deformation in accordance with position information from an image center.

It is also desirable to provide an excellent image processing apparatus, an image processing method, and a computer program which can perform correction in accordance with position information from an image center on an image before the extraction such that the same optical effect as that in an image from which the extraction is not performed is given to an image after the extraction regardless of a difference between the center position of the image after the extraction and the center position of the image before the extraction.

An embodiment of the present disclosure is directed to an image processing apparatus including: an image obtaining unit which obtains an image signal; an extraction position information obtaining unit which obtains information about an extraction position, where an image is extracted, from the image signal; a correction target value calculating unit which calculates a correction target value for correcting the image signal in accordance with the position information from an image center based on the extraction position information; an image correcting unit which corrects the image signal based on the correction target value; and an image extracting unit which extracts the image based on the extraction position information.

According to another embodiment of the present disclosure, the image processing apparatus is configured such that the correction target value calculating unit calculates the correction target value for correcting the image signal, for which the extraction is performed based on the extraction position information, from a reference target value for correcting the image signal for which the extraction is not performed.

According to still another embodiment of the present disclosure, the image processing apparatus is configured such that the correction target value calculating unit calculates the correction target value so as to obtain a same correction effect as that obtained when the image signal for which the extraction is not performed is corrected based on the reference target value.

According to yet another embodiment of the present disclosure, the image processing apparatus is configured such that the extraction position information includes information about an image size after the extraction, and the correction target value calculating unit calculates the correction target value based on a comparison result between the image size before the extraction and the image size after the extraction.

According to still yet another embodiment of the present disclosure, the image processing apparatus is configured such that the extraction position information includes information about an image center position after the extraction, and the correction target value calculating unit calculates the correction target value based on a difference between the image center position before the extraction and the image center position after the extraction.

According to further another embodiment of the present disclosure, the image processing apparatus is configured such that the correction target value calculating unit calculates the correction target value for performing brightness correction of lowering alight quantity in accordance with the position information from the image center.

According to still further another embodiment of the present disclosure, the image processing apparatus is configured such that the correction target value calculating unit amends the correction target value based on a comparison result between standard deviation of brightness of the image signal before the extraction and standard deviation of brightness of the image signal after the extraction.

According to yet further another embodiment of the present disclosure, the image processing apparatus is configured such that the correction target value calculating unit calculates the correction target value for performing deformation emphasis correction of emphasizing a deformation amount in accordance with the position information from the image center.

According to still yet further another embodiment of the present disclosure, the image processing apparatus is configured such that the image processing apparatus further includes: an optical data obtaining unit which obtains optical data in an imaging unit; and a correction value calculating unit which calculates a correction value obtained by correcting the correction target value based on the optical data. Here, the image obtaining unit obtains the image signal captured by the imaging unit, and the image correcting unit corrects the image signal with the use of the correction signal obtained by correcting the correction target value based on the optical data.

According to a further embodiment of the present disclosure, the image processing apparatus is configured such that the optical data obtaining unit obtains the optical data including a type of a lens attached to the imaging unit and an aperture at the time of imaging by the imaging unit, and the correction value calculating unit calculates the correction value by correcting the correction target value for performing brightness correction of lowering the light quantity in accordance with the position information from the image center based on the type of the lens and the aperture obtained as the optical data.

According to a still further embodiment of the present disclosure, the image processing apparatus is configured such that the optical data obtaining unit obtains the optical data including a type of a lens attached to the imaging unit and a focal length at the time of imaging by the imaging unit, and the correction value calculating unit calculates the correction value by correcting the correction target value for performing deformation emphasis correction of emphasizing deformation in accordance with the position information from the image center based on the type of the lens and the focal length obtained as the optical data.

A yet further embodiment of the present disclosure is directed to an image processing method including: obtaining an image signal; obtaining information about an extraction position, where an image is extracted, from the image signal; calculating a correction target value for correcting the image signal in accordance with the position information from an image center based on the extraction position information; correcting the image signal based on the correction target value; and extracting an image based on the extraction position information.

A still yet further embodiment of the present disclosure is directed to a computer readable program to cause the computer to function as: an image obtaining unit which obtains an image signal; an extraction position information obtaining unit which obtains information about an extraction position, where an image is extracted, from the image signal; a correction target value calculating unit which calculates a correction target value for correcting the image signal in accordance with the position information from an image center based on the extraction position information; an image correcting unit which corrects the image signal based on the correction target value; and an image extracting unit which extracts the image based on the extraction position information.

The computer readable program according to the embodiment of the present disclosure is defined so as to realize predetermined processing on a computer. In other words, the computer exhibits cooperative effects by installing the computer program according to the embodiment in the computer, and it is possible to achieve the same effects as those obtained by the image processing apparatus according to the embodiment.

According to the technique disclosed in this specification, it is possible to provide an excellent image processing apparatus, an image processing method, and a computer program which can perform correction to preferably give an optical effect and further to preferably give an optical effect by lowering brightness or enlarging deformation in accordance with the position information from the image center.

According to the technique disclosed in this specification, it is possible to provide an image processing apparatus, an image processing method, and a computer program which can perform correction in accordance with the position information from the image center on the image before the extraction such that the same optical effect as that in the image from which the extraction is not performed can be performed on the image after the extraction regardless of the difference between the center position of the image after the extraction and the center position of the image before the extraction.

Other purposes, features, and advantages of the technique disclosed in this specification will be clarified in the following detailed description based on an embodiment and accompanying drawings which will be described later.

BRIEF DESCRIPTION OF THE DRAWINGS

FIG. 3A is a diagram for illustrating a method for calculating a correction target value which allows an ambient light quantity to be lowered in the same manner as in a reference target value;

FIG. 5A is a diagram showing a correction target value g(x) in a case in which a size and a position of an image after extraction are set such that a center position thereof coincides with that in an image before extraction, with an ambient light quantity lowering amount h(x) due to a lens and an aperture;

FIG. 5B is a diagram showing a correction target value g(x) calculated in Step S204 when a center position of an image after extraction is deviated from that in the image before extraction, with an ambient light quantity lowering amount h(x) due to a lens and an aperture calculated in Step S205.

FIG. 7 is a flowchart showing a processing procedure for performing image extraction after performing image correction to give an optical effect to a captured image in a digital still camera.

DETAILED DESCRIPTION

Hereinafter, description will be given of an embodiment of the technique disclosed in this specification with reference to accompanying drawings.

Figure 1:
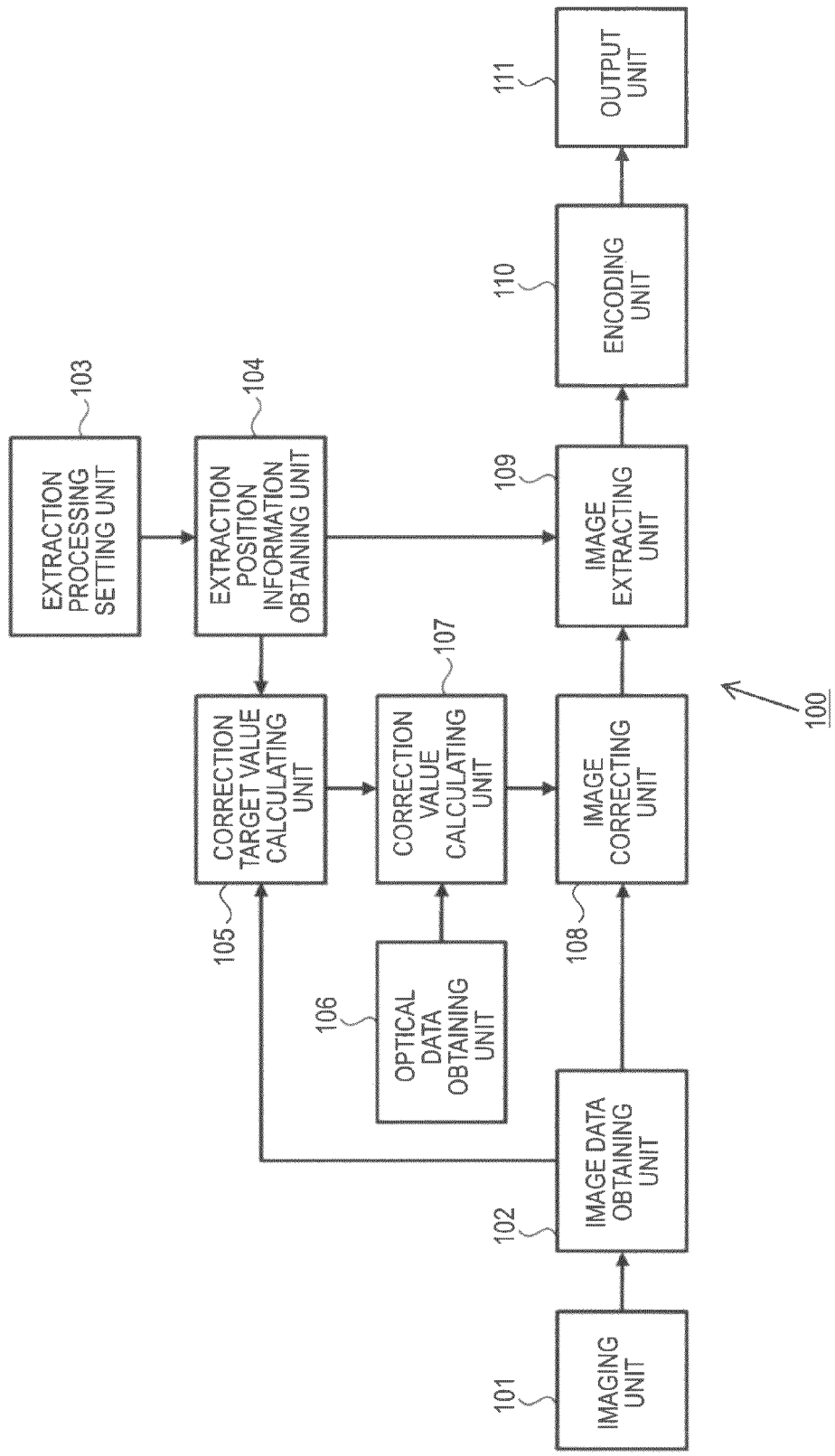
FIG. 1 is a block diagram schematically showing a hardware configuration of a digital still camera according to an embodiment of the technique disclosed in this specification.

FIG. 1 schematically shows a hardware configuration of a digital still camera 100 according to an embodiment of the technique disclosed in this specification. Hereinafter, each part will be described.

An imaging unit 101 is configured by an image sensor such as a CCD, a CMOS, or the like to output an image signal in accordance with a received light quantity.

An image data obtaining unit 102 performs signal processing such as CDS (Correlated Double Sampling), AGC (Automatic Gain Control) or the like on the image signal output from the imaging unit 101 to convert the image signal into a digital signal.

An extraction processing setting unit 103 sets digital zooming magnification and a size and a position of trimming with respect to a captured image by the imaging unit 101 in response to an operation of a user.

An extraction position information obtaining unit 104 obtains position information of an extracted image, which has been determined by an instruction of a user, via the extraction processing setting unit 103.

A correction target value calculating unit 105 calculates a correction target value based on a predetermined reference target value, extraction position information, and image data. The reference target value is a correction target value which is a reference in accordance with position information from an image center of an image before the extraction for giving a predetermined optical effect to the image before the extraction. The "position information from the image center" here may be position information on the basis of an optical axis.

An optical data obtaining unit 106 obtains optical data which depends on a type of a lens and an aperture used in the imaging unit 101.

A correction value calculating unit 107 corrects the correction target value calculated by the correction target value calculating unit 105 based on the optical data obtained by the optical data obtaining unit 106 and calculates a correction value to be actually applied to the image data.

An image correcting unit 108 applies the correction value calculated by the correction value calculating unit 107 to the image data before the extraction and performs optical correction such as brightness correction, deformation correction, and the like.

An image extracting unit 109 generates an extracted image from the image data after the optical correction by the image correcting unit 108, based on the extraction position information obtained by the extraction position information obtaining unit 104.

An encoding unit 110 applies image compression such as JPEG (Joint Photographic Experts Group) or image coding processing to the extracted image.

An output unit 111 outputs image data coded and compressed by the encoding unit 110. An output destination is a memory card, for example, and the output unit 111 records the image data on the memory card.

Figure 2:
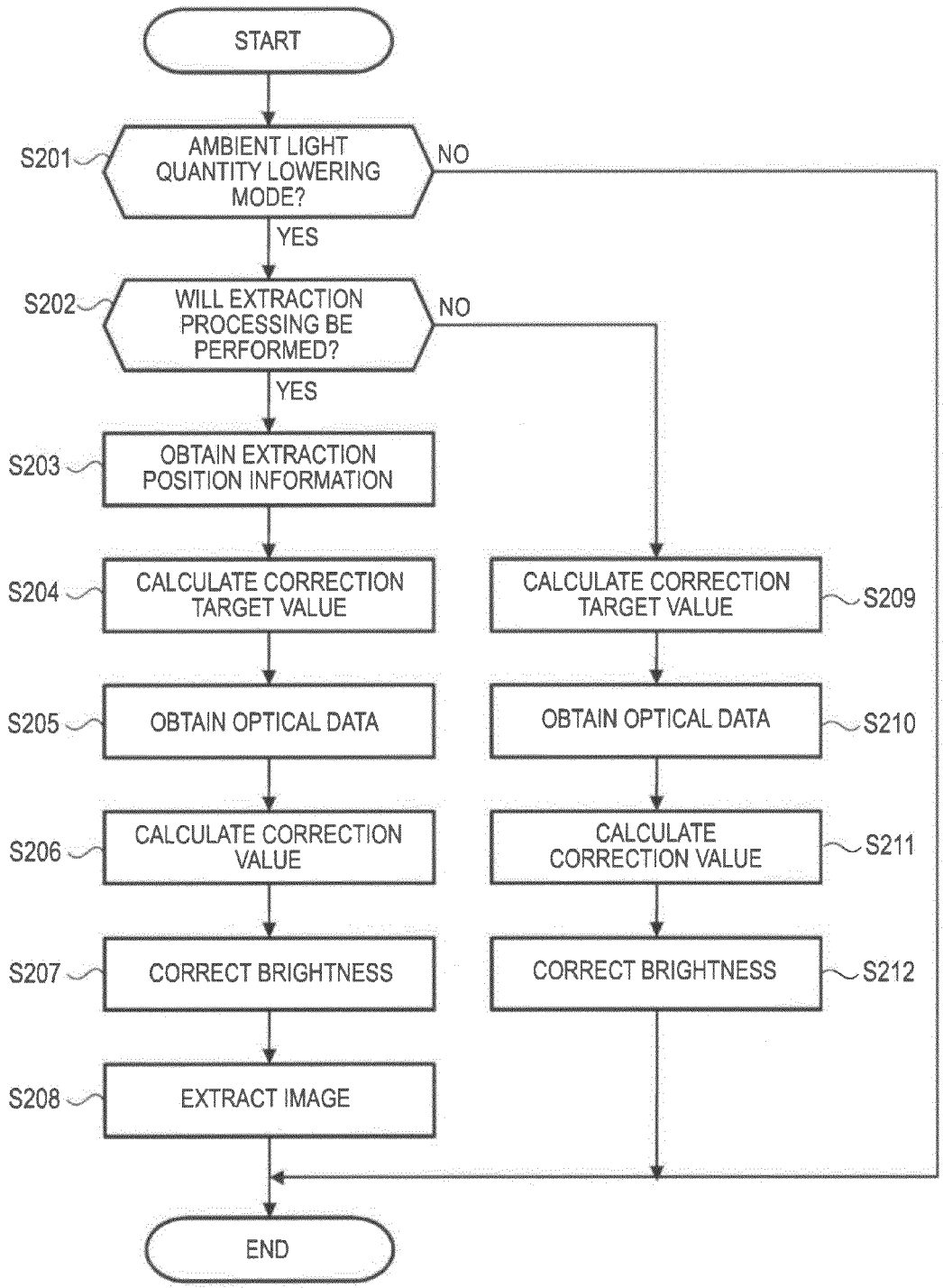
FIG. 2 is a flowchart showing a processing procedure for performing image extraction after performing image correction to give an optical effect on a captured image in a digital still camera.

FIG. 2 shows a processing procedure for performing image extraction based on the extraction position information obtained by the extraction position information obtaining unit 104 after performing image correction for giving an optical effect on the image obtained by the image data obtaining unit 102 in the digital still camera 100 shown in FIG. 1, in the form of a flowchart. In the processing procedure shown in FIG. 2, however, image correction for lowering brightness and lowering ambient light quantity in accordance with the position information from the image center is performed on the image after the extraction as an optical effect.

First, whether the user has set the digital still camera 100 in an ambient light quantity lowering mode is checked (Step S201). When the ambient light quantity lowering mode is not set (No in Step S201), all subsequent steps are skipped, and the processing routine is completed. Other image processing may be performed in some cases when the ambient light quantity lowering mode is not set.

On the other hand, when the ambient light quantity lowering mode is set (Yes in Step S201), whether to perform image extraction in response to an instruction of a user is checked (Step S202).

When the image extraction is performed in response to the instruction of a user (Yes in Step S202), the extraction position information obtaining unit 104 obtains the instruction of a user or automatically determined image extraction position information (Step S203). As image extraction position information, center coordinates of the image after the extraction, an image size before the extraction, and an image size after the extraction are obtained, for example.

Then, the correction target value calculating unit 105 calculates a correction target value in accordance with the position information from the image center of the image before the extraction from image extraction position information obtained by the extraction position information obtaining unit 104 and the predetermined reference target value (Step S204).

Here, description will be given of a method for calculating the correction target value by the correction target value calculating unit 105.

The correction target value calculating unit 105 calculates the correction target value with which the ambient light quantity is lowered in the same manner as in the case of performing correction on the image from which the extraction is not performed, with the reference target value even for the image size after the extraction.

As for a method for calculating the correction target value which allows the ambient light quantity to be lowered in the same manner as that by the reference target value, description will be given with reference to FIG. 3A. As shown in the upper part of the drawing, it is assumed that the size and the position of the image after the extraction are set by the extraction processing setting unit 103 such that the center position thereof coincides with that in the image before the extraction. In addition, the lower part of the drawing shows how the ambient light quantity is lowered while the brightness at the center position of the image is set to 100%. A reference target value f(x) relating to how the light quantity is lowered in accordance with the position information x from the image center is determined in advance as described above. In order to allow how the ambient light quantity is lowered in the image after the extraction to be the same as that in the image before the extraction, a correction target value g(x) relating to how the light quantity is lowered in accordance with the position information x from the image center in the case of performing extraction may be calculated by the following Equation (1), provided that $S_0$ represents an image size before the extraction (a maximum value of the position information from the image center), and $S_1$ represents an image size after the extraction.

$$g(x)=f(x \times S_0/S_1) \quad (1)$$

The correction target value calculating unit 105 maintains a predetermined reference target value f(x) and calculates the correction target value g(x) based on the extracted image position information (an image size and a center position after the extraction) obtained by the extraction position information obtaining unit 104. The correction target value calculating unit 105 may maintain in a nonvolatile manner a correction table in which the correction target value g(x) calculated in advance for the image size of the image after the extraction is written and refer to the correction table when the extraction processing is performed.

In addition, the correction target value calculating unit 105 calculates a correction target value which allows the ambient light quantity to be lowered in the same manner as that by the reference target value regardless of what positional relationship the center position of the image after the extraction and the center position of the image before the extraction are in.

Figure 3B:
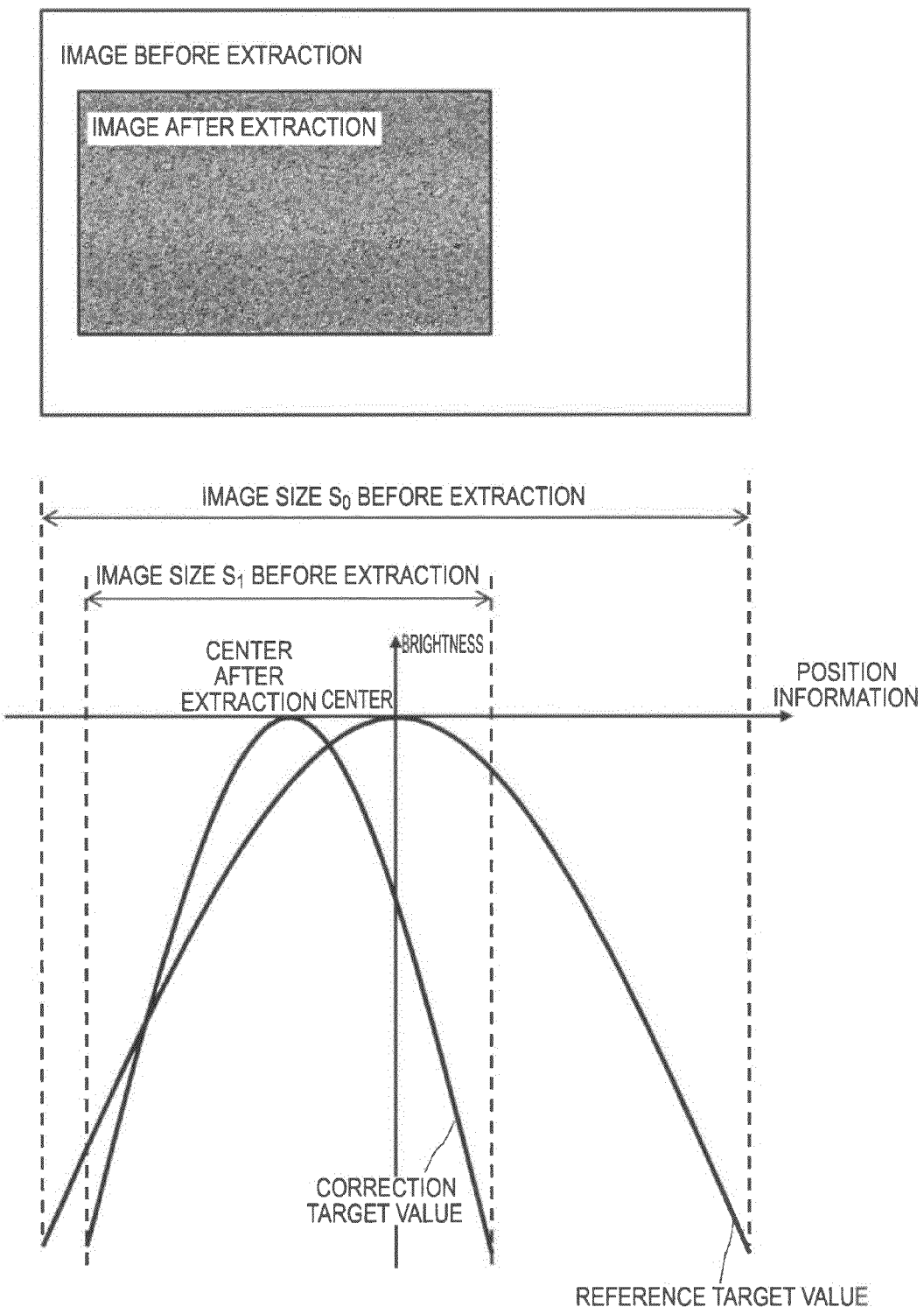
FIG. 3B is a diagram for illustrating a method for calculating a correction target value which allows an ambient light quantity to be lowered in the same manner as in a reference target value regardless of a center position of an image after extraction.

As for a method for calculating the correction target value which allows the ambient light quantity to be lowered in the same manner as that by the reference target value regardless of the center position of the image after the extraction, description will be given with reference to FIG. 3B. As shown in the upper part in the drawing, it is assumed that the extraction processing setting unit 103 sets the size and the position of the image after the extraction such that the center position is deviated by Δx from the image before the extraction. As described above, the reference target value f(x) relating to how the light quantity is lowered in accordance with the position information x from the image center is determined in advance. In order to allow the ambient light quantity to be lowered in the image after the extraction in the same manner as in the image before the extraction even if the center position is deviated, the correction target value g(x) relating to how the light amount is lowered in accordance with the position information x from the image center when the extraction is performed may be calculated by the following Equation (2), provided that $S_0$ represents an image size before the extraction (a maximum value of the position information from the image center), and $S_1$ represents an image size after the extraction.

$$g(x)=f((x-\Delta x) \times S_0/S_1) \quad (2)$$

The correction target value calculating unit 105 maintains a predetermined reference target value f(x) and calculates the correction target value g(x) as shown in the above Equation (1) or (2) based on the position information (the size and the center position of the image after the extraction) of the extracted image obtained by the extraction position information obtaining unit 104. The correction target value calculating unit 105 may maintain in a nonvolatile manner a correction table in which the correction target value g(x) calculated in advance for each image size of the image after the extraction is described and refer to the correction table when the extraction processing is performed.

In addition, the correction target value calculating unit 105 may use luminance distribution information of the image data for the calculation of the correction target value. The effect obtained by lowering the ambient light quantity can be easily observed in an object with uniform brightness. For this reason, standard deviation $\sigma_0$ of brightness in the image data before the extraction and standard deviation $\sigma_1$ of brightness in the image data corresponding to the image after the extraction may be compared with each other, and the correction target value calculated based on the image size after the extraction may be amended based on the comparison result. For example, the correction target value g(x) relating to how the light amount is lowered in accordance with the position information x from the image center when the extraction is performed may be calculated by the following Equation (3) with the use of standard deviation $\sigma_0$ of brightness in the image data before the extraction and the standard deviation $\sigma_1$ of the brightness in the image data corresponding to the image after the extraction.

$$g(x)=f(x \times \sigma_1/\sigma_0 \times S_0/S_1) \quad (3)$$

As an example of the reference target value f(x) in accordance with the position information x from the image center, the following Equation (4) can be exemplified, provided that the center position of the image is x=0, and the maximum value $S_0$ of the position information from the image center is 14.

$$f(x)=(\cos(\alpha \tan(x/y)))^4 \quad (4)$$

Figure 4A:
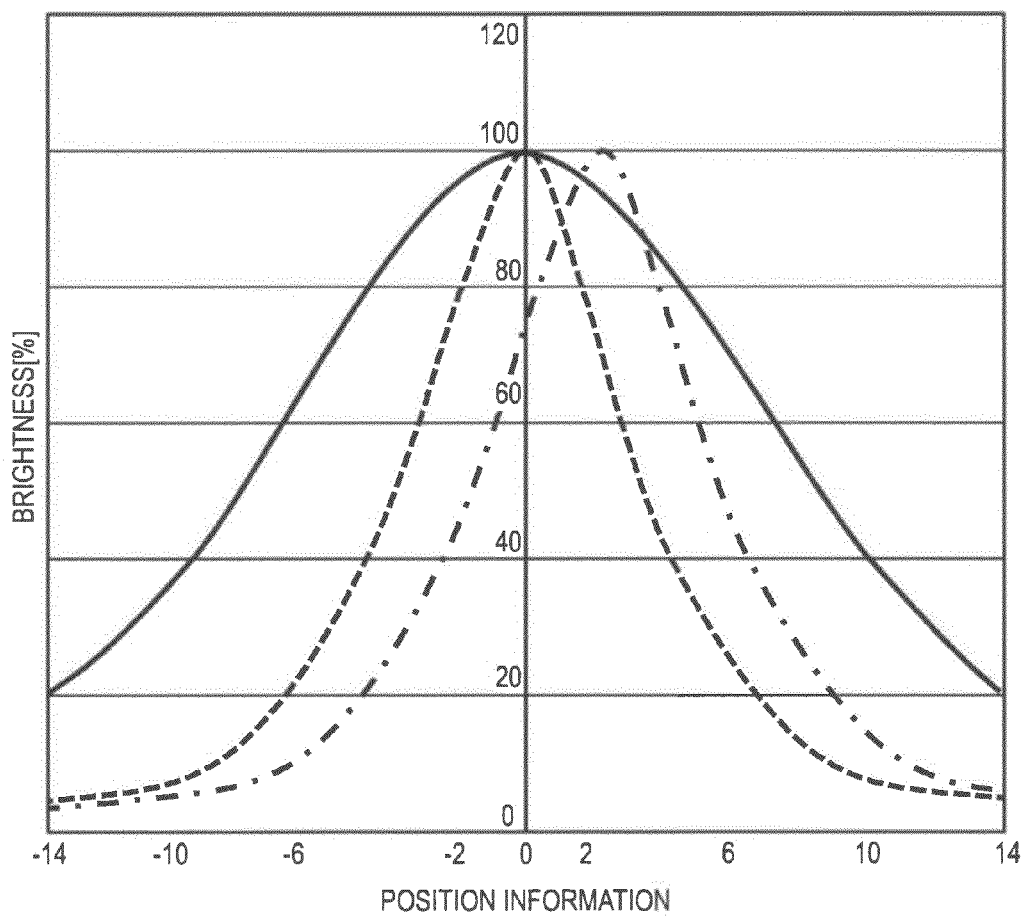
FIG. 4A is a diagram showing a specific example of a reference target value and a correction target value.

In the above Equation (4), y represents a parameter which determines how the ambient light quantity is lowered. In FIG. 4A, the reference target value f(x) is shown by a solid line when y=12.

When the center position is made to coincide with that in the image before the extraction, and image extraction is performed while the trimming size is set to a half (that is, the size $S_1$ of the image after the extraction is 7), the correction target value $g_1(x)$ is obtained as in the following equation (5) based on the above Equation (3). In FIG. 4A, the correction target value $g_1(x)$ at this time is shown by a broken line.

$$g_1(x)=(\cos(\alpha \tan((x \times 14/7)/y)))^4 \quad (5)$$

When the trimming size is set to a half (that is, the image size after the extraction is 7), and the image extraction is performed while the center position is moved from that in the image before the extraction by Δx=3, the correction target value $g_2(x)$ is obtained as in the following Equation (6) based on the above Equation (4). In FIG. 4A, the correction target value $g_2(x)$ at this time is shown by a one-dotted chain line.

$$g_2(x)=(\cos(\alpha \tan(((x-3) \times 14/7)/y)))^4 \quad (6)$$

The correction target value $g_2(x)$ is corrected based on the comparison result between the standard deviation $\sigma_0$ of brightness in the image data before the extraction and the standard deviation $\sigma_1$ of brightness in the image data corresponding to the image after the extraction, as the following Equation (7).

$$g_2(x)=(\cos(\alpha \tan(((x-3) \times \sigma_1/\sigma_0 \times 14/7)/y)))^4 \quad (7)$$

Figure 4B:
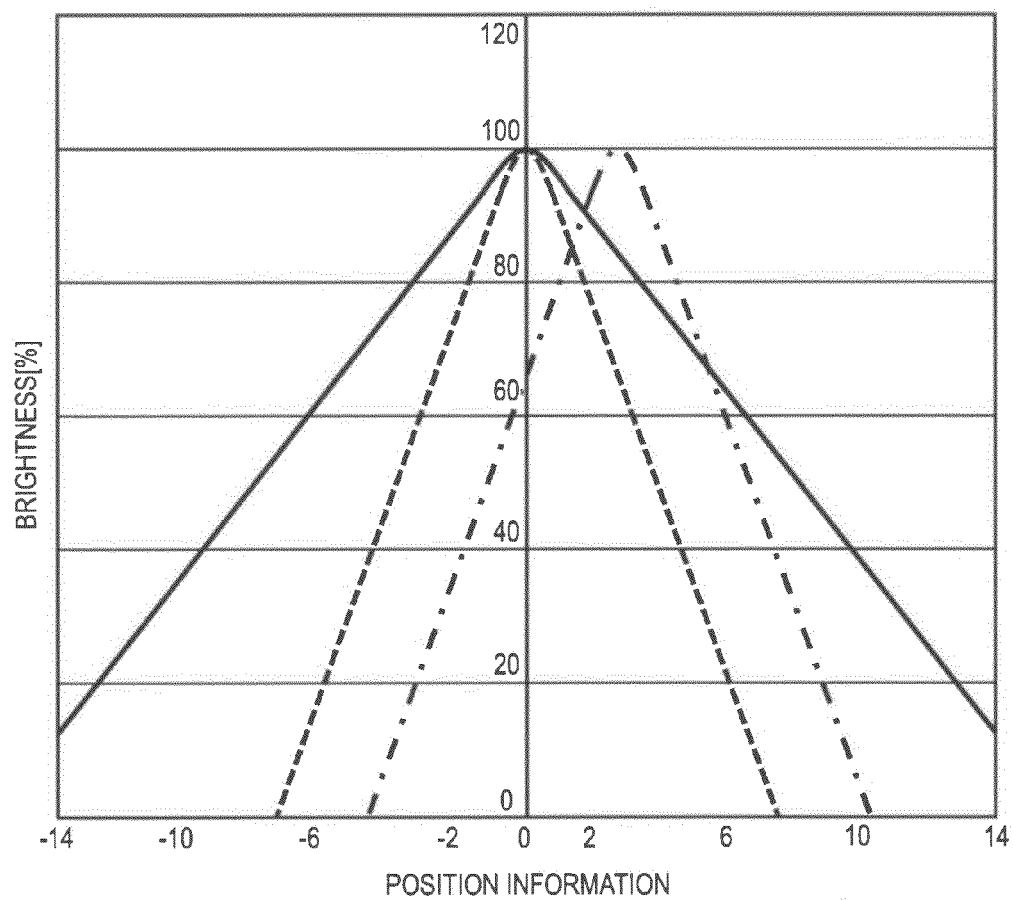
FIG. 4B is a diagram showing a specific example of a reference target value and a correction target value.

In addition, it is not necessary that the reference target value and the correction target value are curves as shown in the above Equations (4) and (5) and FIG. 4A. For example, as shown in FIG. 4B, a reference target value and a correction target value represented as straight lines may be used (however, the solid line in the drawing represents a reference target value, the broken line represents a correction target value of the extracted image with the same center position, and the one-dotted chain line represents a correction target value of the extracted image with the deviated center position).

Referring back to FIG. 2, description will be given of a processing procedure for performing image correction on a captured image.

The light quantity in the captured image is lowered when the light passes through the lens, and the ambient light quantity is lowered by the aperture. The correction value calculating unit 107 obtains optical data which depends on a type of the lens and the aperture used in the imaging unit 101 from the optical data obtaining unit 106 and then calculates the ambient light quantity lowering amount h(x) which depends on the lens and the aperture (Step S205).

Next, the correction value calculating unit 107 amends the correction target value g(x) calculated by the correction target value calculating unit 105 in Step S204 based on the ambient light quantity lowering amount h(x) due to the lens and the aperture calculated in Step S205 and calculates the correction value g'(x) in the position information x from each image center as shown in the following Equation (8). The amended correction value g'(x) is a correction value which is actually applied to the image data.

$$g'(x) = g(x)/h(x) \tag{8}$$

FIG. 5A shows the correction target value g(x) calculated in Step S204 when the size and the position of the image after the extraction are set such that the center position coincides with that in the image before the extraction with the ambient light quantity lowering amount h(x) due to the lens and the aperture calculated in Step S205. However, the brightness at the center position in the image is set to 100%, and how the ambient light quantity is lowered is shown. FIG. 5B shows the correction target value g(x) calculated in Step S204 when the center position of the image after the extraction is deviated from that in the image before the extraction with the ambient light quantity lowering amount h(x) due to the lens and the aperture calculated in Step S205.

The obtained correction value g'(x) is a value between 0 and 1, and the correction value 1 corresponds to no correction of the light quantity. For example, if the correction target value g(x) is 0.2 and the ambient light quantity lowering amount h(x) is 0.8 in the position information x from the image center, the correction value g'(x) becomes 0.2/0.8=0.25.

However it is not necessary to correct the correction target value g(x) by the ambient light quantity lowering amount h(x) which depends on the lens and the aperture, and the correction target value g(x) calculated in Step S204 may be applied as it is to the image. In such a case, Steps S205 and S206 are skipped. Otherwise, when the optical data is not obtained in Step S205 such as a case in which a type of the lens used in the imaging unit 101 is not specified, the correction target value g(x) calculated in Step S204 may be applied to the image as it is.

Next, the image correcting unit 108 applies the correction value g'(x) calculated in Step S206 to the image data obtained by the image data obtaining unit 102 and performs image correction in which the ambient light quantity is lowered (Step S207). Alternatively, the correction target value g(x) calculated in Step S204 is applied to the image data, and the image correction is performed.

Then, the image extracting unit 109 generates an extracted image from the image data on which the optical correction has been performed by the image correcting unit 108 based on the extraction position information obtained by the extraction position information obtaining unit 104 (Step S208) and completes the processing routine. However, it is possible to replace the order in which Steps S207 and S208 are performed.

When the image extraction is not performed in response to the instruction of a user (No in Step S202), the correction target value calculating unit 105 sets the predetermined reference target value as the correction target value (Step S209).

Next, the correction value calculating unit 107 obtains optical data which depends on the type of the lens and the aperture used in the imaging unit 101 from the optical data obtaining unit 106 and calculates the ambient light quantity lowering amount which depends on the lens and the aperture (Step S210).

Next, the correction value calculating unit 107 amends the correction target value based on the ambient light quantity lowering amount (Step S211).

Then, the image correcting unit 108 applies the correction value calculated in Step S211 to the image data obtained by the image data obtaining unit 102, performs image processing for lowering the ambient light quantity (Step S212), and completes the processing routine.

Figure 6A:
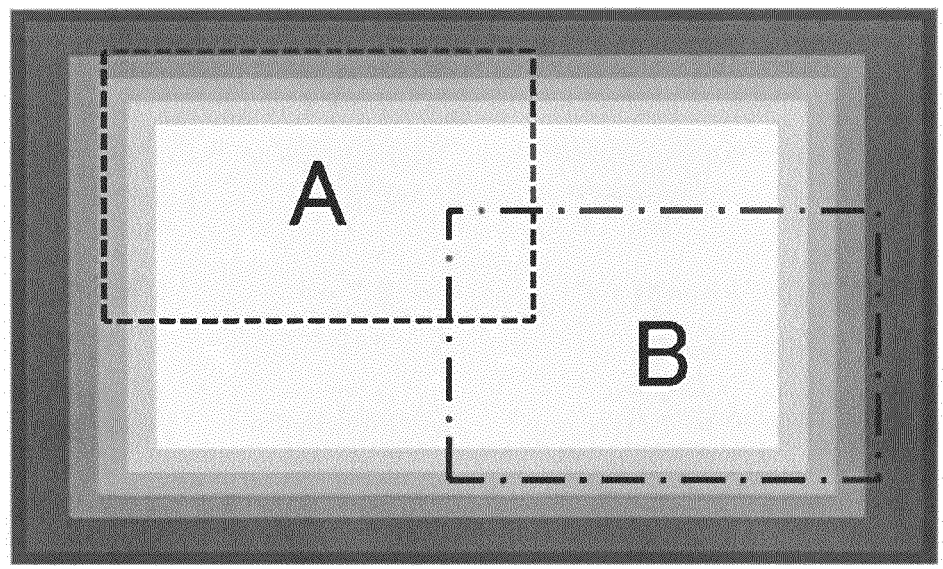
FIG. 6A is a diagram showing a state in which an ambient light quantity is lowered due to image correction when image extraction is not performed.
Figure 6B:
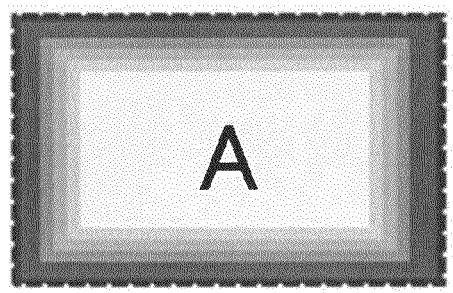
FIG. 6B is a diagram showing a state in which an ambient light quantity is lowered due to image correction when image extraction is performed.
Figure 6C:
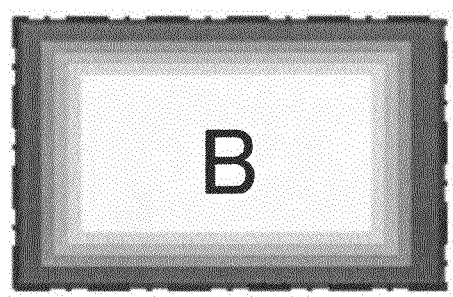
FIG. 6C is a diagram showing a state in which an ambient light quantity is lowered due to image correction when image extraction is performed.

FIG. 6A shows a state in which the ambient light quantity is lowered by the image correction when the image extraction is not performed (No in Step S202). FIGS. 6B and 6C show states, in each of which the ambient light quantity is lowered by the image correction when the extraction is performed for the region surrounded by a broken line and a one-dotted chain line in FIG. 6C (Yes in Step S202). It is possible to understand that the same effects of lowering the ambient light quantity as that in the image from which the extraction is not performed can be obtained in the image on which the extraction has been performed by performing the above processing.

FIG. 7 shows a processing procedure for performing image extraction after performing the image correction for giving an optical effect to the obtained image in the digital still camera 100 in a form of a flowchart. However, in the processing procedure shown in FIG. 7, image correction for emphasizing deformation in accordance with the position information from the image center is performed on the image after the extraction as the optical effect.

First, whether the user has set the digital still camera 100 to a deformation emphasis mode is checked (Step S701). When the deformation emphasis mode is not set (No in Step S701), all subsequent steps are skipped, and the processing routine is completed. Other image processing may be performed in some cases when the deformation emphasis mode is not set.

On the other hand, when the deformation emphasis mode is set (Yes in Step S701), whether to perform the image extraction in response to the instruction of a user is then checked (Step S702).

When the image extraction is performed in response to the instruction of a user (Yes in Step S702), the extraction position information obtaining unit 104 obtains the instruction of a user or the automatically determined image extraction position information (Step S703).

Then, the correction target value calculating unit 105 calculates a correction target value in accordance with the position information from the image center of the image before the extraction from the image extraction position information obtained by the extraction position information obtaining unit 104 and the predetermined reference target value (Step S704).

If the reference target value f(x) relating to the deformation emphasis in accordance with the position information x from the image center is determined in advance, the correction target value g(x) relating to the deformation emphasis in accordance with the position information x from the image center when the extraction is performed may be calculated as in the following Equation (9), provide that Δx represents a deviation amount of the center position from that in the image before the extraction, $S_0$ represents an image size before the extraction (a maximum value of the position information from the image center), and $S_1$ represents an image size after the extraction.

$$g(x)=f((x-\Delta x) \times S_0/S_1) \quad (9)$$

The correction target value calculating unit 105 maintains the predetermined reference target value f(x) and calculates the correction target value g(x) as shown in the above Equation (9) based on the extracted image position information (the size and the center position of the image after the extraction) obtained by the extraction position information obtaining unit 104. The correction target value calculating unit 105 may maintain in a nonvolatile manner a correction table in which the correction target value g(x) calculated in advance for each image size of the image after the extraction is described and refer to the correction table when the extraction processing is performed.

The deformation occurs in the captured image at the time of passing through the lens, and the deformation amount is varied in accordance with the focal length at the time of imaging. The correction value calculating unit 107 obtains the distortion aberration information which depends on the type of the lens used in the imaging unit 101 and the focal length from the optical data obtaining unit 106 and calculates the distortion aberration amount h(x) in accordance with the position information x from the image center which depends on the lens and the focal length (Step S705).

Next, the correction value calculating unit 107 amends the correction target value g(x) calculated by the correction target value calculating unit 105 in Step S704 based on the distortion aberration amount h(x) due to the lens and the focal length calculated in Step S705 and calculates the correction value g'(x) in the position information x from each image center as shown in the following Equation (10). The amended correction amount g'(x) is the correction value which is actually applied to the image data.

$$g'(x)=g(x)/h(x) \quad (10)$$

However, it is not necessary to correct the correction target value g(x) due to the distortion aberration amount h(x) which depends on the lens and the focal length, and the correction target value g(x) calculated in Step S704 may be applied as it is to the image. In such a case, Steps S705 and S706 are skipped. Otherwise, when the optical data is not obtained in Step S205 such as a case in which the type of the lens used in the imaging unit 101 is not specified, a case in which the focal length at the time of imaging has not been recorded, or the like, the correction target value g(x) calculated in Step S704 may be applied as it is to the image.

Subsequently, the image correcting unit 108 applies the corrected value g'(x) calculated in Step S706 to the image data obtained by the image data obtaining unit 102 and performs image correction of deformation emphasis (Step S707). Alternatively, the correction target value g(x) calculated in Step S704 is applied to the image data, and image correction is performed.

Then, the image extracting unit 109 generates an extracted image from the image data after performing the optical correction by the image correcting unit 108 based on the extraction position information obtained by the extraction position information obtaining unit 104 (Step S708) and completes the processing routine. However, it is possible to replace the order in which Steps S707 and S708 are executed.

In addition, when the image extraction is not performed in response to the instruction of a user (No in Step S702), the correction target value calculating unit 105 sets the predetermined reference target value as the correction target value (Step S709).

Next, the correction value calculating unit 107 obtains the optical data which depends on the type of the lens used in the imaging unit 101 and the focal length from the optical data obtaining unit 106 and calculates the distortion aberration amount which depends on the lens and the aperture (Step S710).

Next, the correction value calculating unit 107 corrects the correction target value based on the distortion aberration amount (Step S711).

Then, the image correcting unit 108 applies the correction value calculated in Step S711 to the image data obtained by the image data obtaining unit 102, performs image correction of deformation emphasis (Step S712), and completes the processing routine.

As described above, according to the technique proposed in this specification, it is possible to obtain the same optical correction effect as that in the image from which the extraction processing is not performed even if extraction processing is performed on the image on which correction of lowering the ambient light quantity or deformation emphasis correction has been performed. Moreover, it is possible to obtain the same optical correction effect as that in the image before the extraction even if the center position is deviated in the extraction processing.

The technique proposed in this specification has been described above in detail with reference to the specific embodiments. However, it is apparent that those skilled in the art can attain modification and alternation of the embodiments without departing from the gist of the technique proposed in this specification.

This specification describes mainly the embodiments in which image processing is performed to an image captured by a digital still camera. However, application of the technique disclosed in this specification is not limited to them, and the technique disclosed in this specification can also applicable to a moving image and an artificial image generated through the computer graphics and the like.

That is, the technique proposed in this specification has been disclosed by way of example and the content of this specification should not be construed in a limited manner. The gist of the technique proposed in this specification should be construed with the scope of the appended claims being taken into consideration.

The present disclosure contains subject matter related to that disclosed in Japanese Priority Patent Application JP 2011-083996 filed in the Japan Patent Office on Apr. 5, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    an image obtaining unit configured to obtain an image signal;
    an extraction position information obtaining unit configured to obtain information about an extraction position, where an image is extracted, from the image signal;
    a correction target value calculating unit configured to calculate a correction target value for correcting the image signal in accordance with the position information from an image center based on the extraction position information;

a second correction value calculating unit configured to calculate a second correction value that is obtained by updating the calculated correction target value based on optical characteristics of the image processing apparatus;

an image correcting unit configured to correct the image signal by selecting one of the calculated correction target value and the calculated second correction value; and an image extracting unit which extracts the image based on the extraction position information.

2. The image processing apparatus according to claim 1, wherein the correction target value calculating unit calculates the correction target value for correcting the image signal, for which the extraction is performed based on the extraction position information, from a reference target value for correcting the image signal for which extraction is not performed.

3. The image processing apparatus according to claim 2, wherein the correction target value calculating unit calculates the correction target value so as to obtain a same correction effect as that obtained when the image signal for which the extraction is not performed is corrected based on the reference target value.

4. The image processing apparatus according to claim 1, wherein the extraction position information includes information about an image size after the extraction, and wherein the correction target value calculating unit calculates the correction target value based on a comparison result between the image size before the extraction and the image size after the extraction.

5. The image processing apparatus according to claim 1, wherein the extraction position information includes information about an image center position after the extraction, and wherein the correction target value calculating unit calculates the correction target value based on a difference between the image center position before the extraction and the image center position after the extraction.

6. The image processing apparatus according to claim 1, wherein the correction target value calculating unit calculates the correction target value for performing brightness correction of lowering a light quantity in accordance with the position information from the image center.

7. The image processing apparatus according to claim 6, wherein the correction target value calculating unit amends the correction target value based on a comparison result between standard deviation of brightness of the image signal before the extraction and standard deviation of brightness of the image signal after the extraction.

8. The image processing apparatus according to claim 1, wherein the correction target value calculating unit calculates the correction target value for performing deformation emphasis correction of emphasizing a deformation amount in accordance with the position information from the image center.

9. The image processing apparatus according to claim 1, further comprising:

an optical data obtaining unit configured to obtain optical characteristics of an imaging unit; and the second correction value calculating unit calculates the second correction value obtained by correcting the calculated correction target value by a lowering amount that is based on the optical characteristics of the imaging unit, wherein the image obtaining unit obtains the image signal captured by the imaging unit, and wherein the image correcting unit corrects the image signal with the use of the correction value obtained by correcting the correction target value based on the optical characteristics of the imaging unit.

10. The image processing apparatus according to claim 9, wherein the optical data obtaining unit obtains the optical characteristics including a type of a lens attached to the imaging unit and an aperture at the time of imaging by the imaging unit, and wherein the second correction value calculating unit calculates the second correction value by correcting the correction target value for performing brightness correction of lowering the light quantity in accordance with the position information from the image center based on the type of the lens and the aperture obtained as the optical characteristics.

11. The image processing apparatus according to claim 9, wherein the optical data obtaining unit obtains the optical characteristics including a type of a lens attached to the imaging unit and a focal length at the time of imaging by the imaging unit, and wherein the second correction value calculating unit calculates the second correction value by correcting the correction target value for performing deformation emphasis correction of emphasizing deformation in accordance with the position information from the image center based on the type of the lens and the focal length obtained as the optical data.

12. An image processing method comprising:

obtaining an image signal;

obtaining information about an extraction position, where an image is extracted, from the image signal;

calculating a correction target value for correcting the image signal in accordance with the position information from an image center based on the extraction position information;

computing a second correction value obtained by updating the calculated correction target value based on optical characteristics of an image processing apparatus;

correcting the image signal by selecting one of the correction target value and the second correction value; and extracting the image based on the extraction position information.

13. A non-transitory computer readable medium having stored thereon a program that when executed by a computer causes the computer to execute a method comprising:

obtaining an image signal;

obtaining information about an extraction position, where an image is extracted, from the image signal;

calculating a correction target value for correcting the image signal in accordance with the position information from an image center based on the extraction position information;

computing a second correction value obtained by updating the calculated correction target value based on optical characteristics of an image processing apparatus;

correcting the image signal by selecting one of the correction target value and the second correction value; and extracting the image based on the extraction position information.

* * * * *